United States Patent
Roos et al.

[11] Patent Number: 5,971,769
[45] Date of Patent: Oct. 26, 1999

[54] INTERMEDIATE COUPLING

[75] Inventors: Sture Gösta Roos, Bergshamra; Erik Fischer, Huddinge; Uno Sigurd Nilsson, Saltsjö-Boo, all of Sweden

[73] Assignee: Telefonaktiebolaget LM Ericsson, Stockholm, Sweden

[21] Appl. No.: 09/125,003

[22] PCT Filed: Feb. 1, 1997

[86] PCT No.: PCT/SE97/00156

§ 371 Date: Aug. 26, 1998

§ 102(e) Date: Aug. 26, 1998

[87] PCT Pub. No.: WO97/28656

PCT Pub. Date: Aug. 7, 1997

[30]   Foreign Application Priority Data

Feb. 1, 1996 [SE] Sweden ................................. 9600358

[51] Int. Cl.[6] .................................................. H01R 29/00
[52] U.S. Cl. ............................................. 439/49; 439/507
[58] Field of Search ....................................... 439/49, 507

[56]   References Cited

U.S. PATENT DOCUMENTS

| | | |
|---|---|---|
| 4,213,013 | 7/1980 | Perna et al. ............................. 379/327 |
| 4,221,445 | 9/1980 | Fleischhacker et al. .................. 439/43 |
| 4,335,929 | 6/1982 | Abernethy ................................. 439/49 |
| 4,764,849 | 8/1988 | Khan ......................................... 439/49 |
| 4,834,669 | 5/1989 | Siemon et al. .......................... 439/395 |
| 5,133,672 | 7/1992 | Nelligan, Jr. et al. .................. 439/399 |
| 5,432,847 | 7/1995 | Hill et al. ................................ 379/383 |
| 5,718,604 | 2/1998 | Conorich et al. ......................... 439/49 |

*Primary Examiner*—Khiem Nguyen
*Assistant Examiner*—T C Patel
*Attorney, Agent, or Firm*—Burns, Doane, Swecker & Mathis, L.L.P.

[57]   ABSTRACT

The invention relates to a cross-connection arrangement for a telephone exchange. The arrangement includes a frame (1), a number of frame-mounted subscriber-associated connection pins (24, 24') in one or more terminal units (2a), and a number of frame-mounted telephone-exchange-related line-circuit-associated connection pins in one or more terminal units (3a'). The terminal units are disposed close together and have necessary jumpers (23) for connecting selected subscriber connection pins with selected telephone-exchange connection pins via contact devices (33, 34) connected to the ends of said conductors. The contact devices (33, 34) and the conductors (31, 32) extend into an open space (26) defined by a bar (20) to which the subscriber terminal units (2a) are related.

17 Claims, 2 Drawing Sheets

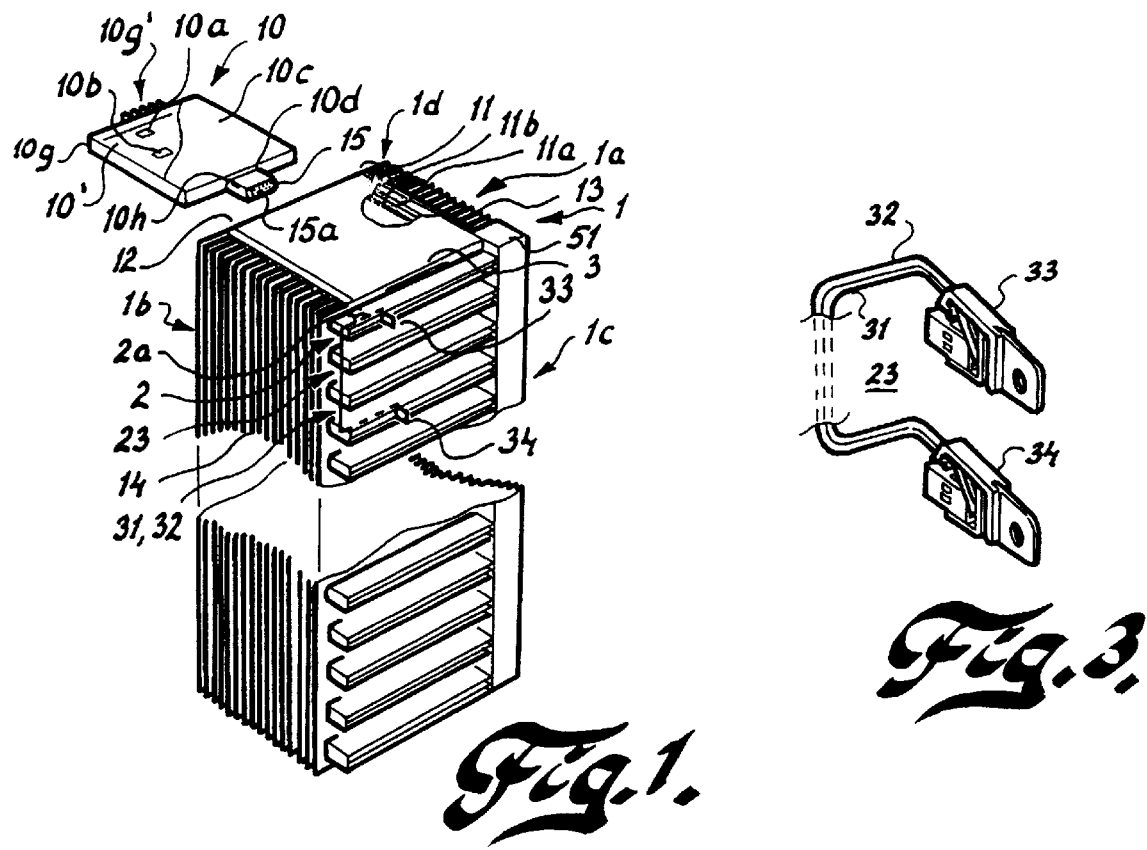
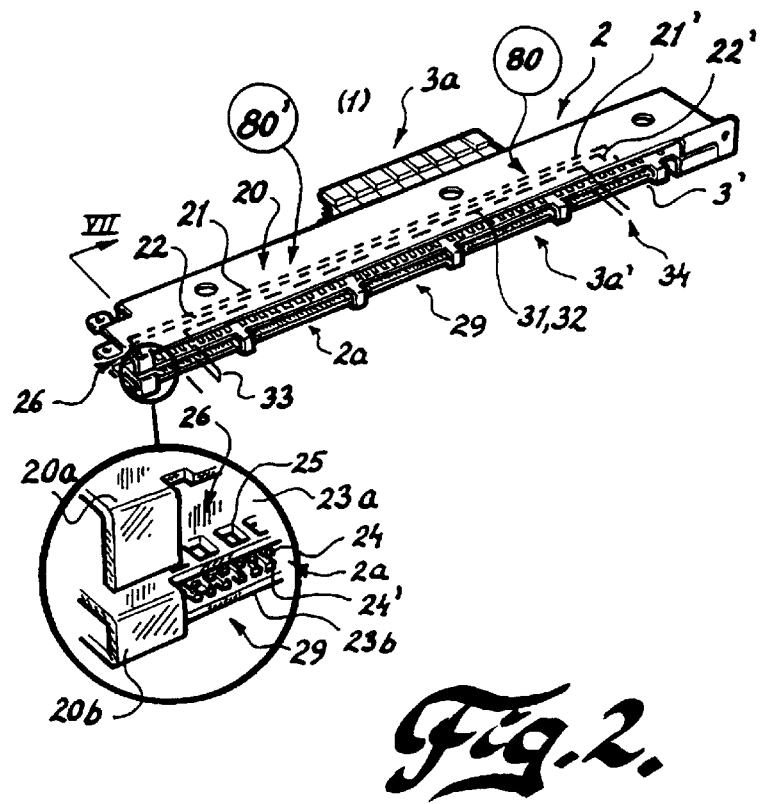

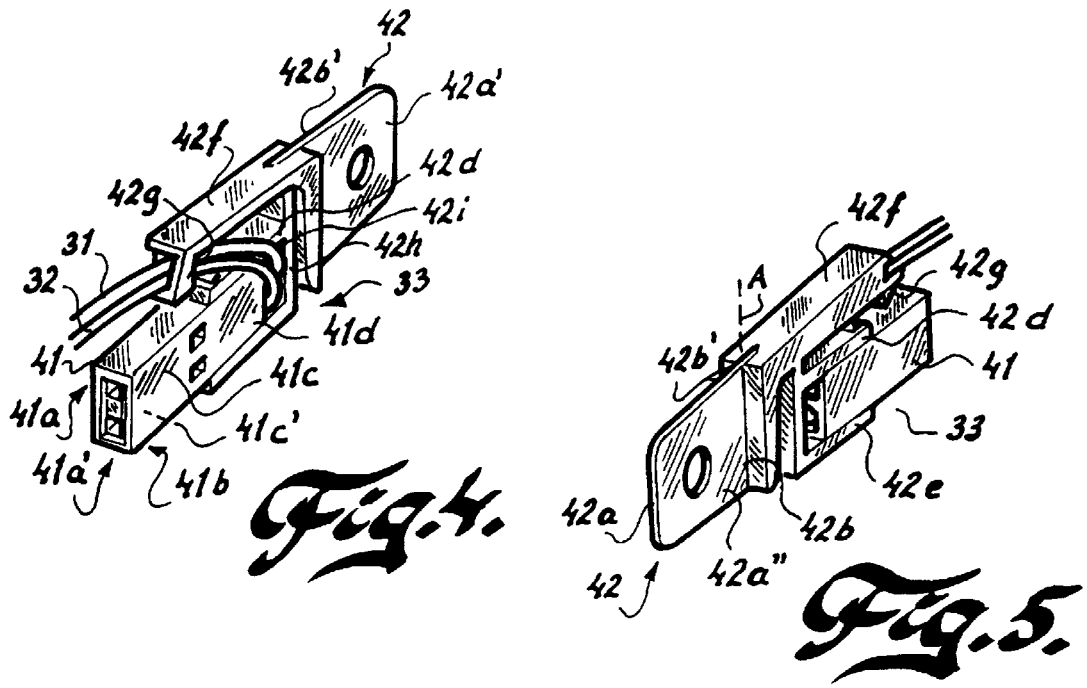
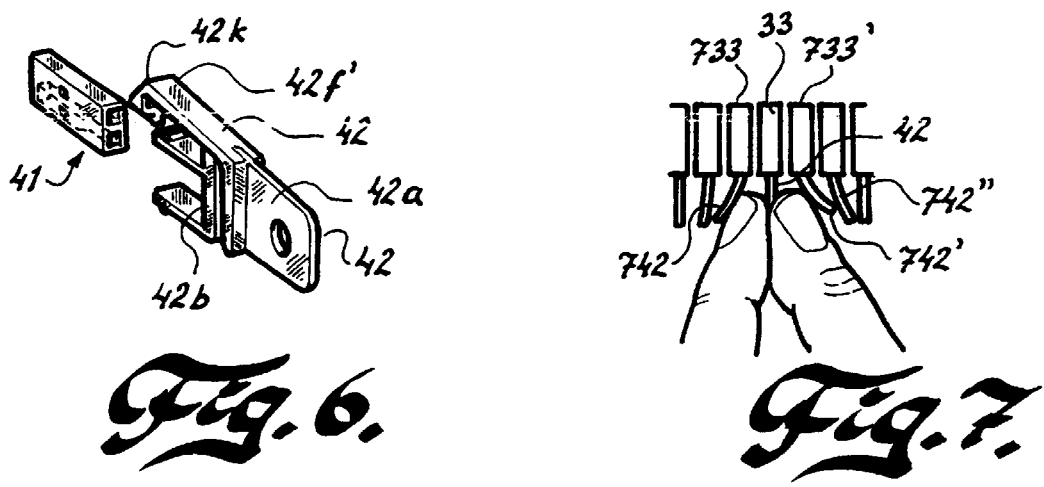
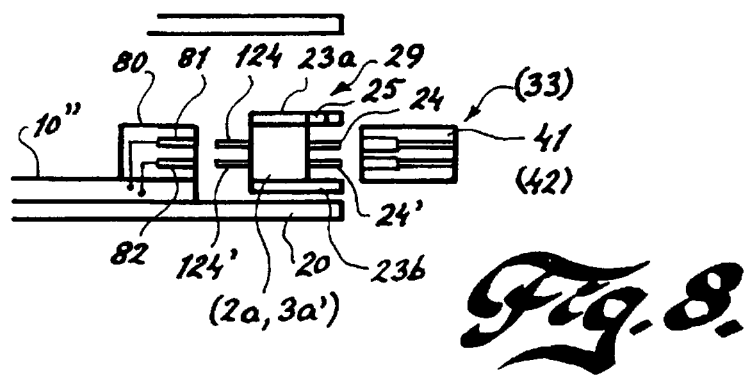

INTERMEDIATE COUPLING

TECHNICAL FIELD

The present relates to a cross-connection arrangement or jumpering arrangement in a telephone exchange, and more particularly to a cross-connection arrangement that requires a distribution frame, a number of subscriber or connection related connection units fixedly mounted on the frame, and a number of telephone-exchange-related connection units fixedly mounted on said frame, wherein the connection units are positioned close together and with requisite cross-connection conductors, so-called jumpers, adapted to connect selected subscriber-related connection pins within said subscriber-related connection units with selected connection pins related to the telephone exchange and located in said telephone-exchange-related connection units.

The expression telephone-exchange-related cross-connection arrangements that include subscriber-related connection units and the like also encompasses cross-connection arrangements in private branch exchanges that include a number of connection-related connection units fixedly mounted on the distribution frame.

DESCRIPTION OF THE BACKGROUND OF THE INVENTION

Cross-connection arrangements adapted for telephone exchanges or private branch exchanges and including a frame that carries line interface boards are known to the art. These cross-connection arrangements take-up a large volume of space in relation to the total telephone exchange space of a complete telephone exchange.

Thus, it is known that about 80% of the total volume of a modern telephone station is taken-up by line interface boards and the cross-connection or jumpering arrangement connected thereto.

In this regard, it is known to coordinate line circuits belonging to a telephone exchange on circuit boards (designated line boards or line interface boards), i.e. printed circuit boards on which discrete components are mounted, and to position these circuit boards in the close proximity of the cross-connection arrangement.

It is also known to structure-up remaining functions of a telephone exchange with additional printed circuit board assemblies and/or line interface boards and the like within one or more frames and to provide means whereby said boards are able to coact electrically with the line circuits and their printed board assemblies.

It is also known to arrange the line circuit board in a line circuit board magazine and line circuit board cabinet and to allocate an infrastructure that is the same for remaining parts and functions of the telephone exchange, i.e. selectors and processors.

In order to be able to connect each of the line circuits on the line interface boards with a selected subscriber, there is either required a so-called cross-connection, designated MDF (Main Distribution Frame) or an exchange-internal "cross-connection", i.e. a facility in which each line circuit can be redistributed to a selected subscriber internally in the exchange.

The lines extending from subscribers are normally coordinated in cables and each terminated with a respective connection pin disposed in terminal units. The lines belonging to the telephone exchange are also terminated from the line circuits with a respective connection pin arranged in a terminal unit. This connection is normally a two-wire connection.

Such terminal units are normally mounted in an individual infrastructure and often comprise carriers in the form of U-bars or rails.

With regard to the distinctive features of the present invention, it is known to use two (or more) conductors that have end-related contact devices so as to be able to readily connect, as "jumpers", pairs of connection pins in a selected subscriber-related connection-pin arrangement with pairs of connection pins in a telephone-exchange-related connection pin arrangement included in requisite terminal units.

These conductors have been allowed to pass through the shortest distance between separate connection-pin arrangements and selected connection pins therein, and have therewith often been caused to pass transversely across intermediate terminal units.

SUMMARY OF THE INVENTION

TECHNICAL PROBLEMS

When considering the earlier state of the art as described above, it will be seen that a technical problem is one of providing conditions with the aid of simple means that will enable used jumpers to readily connect, with an electrical conductor section and end-related contact devices, selected (two) connection pins within a selected subscriber-related connection pin arrangement in a terminal unit with selected (two) connection pins in a selected exchange-related connection pin arrangement in a terminal unit, by using the contact devices connected to the ends of the conductors, and therewith create conditions which enable the adapted conductor section between the contact devices to pass directly into an open space defined by a U-bar and located above a relevant connection-pin arrangement and then, when necessary, allowed to bend along said relevant connection-pin arrangement and relevant terminal units, and thereafter bend again so as to pass completely on one side of intermediate connection-pin arrangements, and thereafter to again bend and pass into an open space defined by a parallel-related bar and located immediately above a new relevant connection-pin arrangement or terminal unit for a parallel-related bar.

It will also be seen that a technical problem is one of providing with the aid of simple means conditions that will enable one or more connection-pin arrangements in a subscriber-line terminal unit and connection-pin arrangements in a telephone-exchange-related terminal unit to be coordinated in one and the same barlike base unit which can be readily inserted and withdrawn in a direction towards and away from said bar with the open space located above the base unit.

It will also be seen that a technical problem in this regard is one of providing a contact arrangement that is adapted for cross-connection and that has a first elongated part that includes a number (two) of through-penetrating longitudinally orientated holes, and therewith to realize that each of these holes shall be adapted to coact in the connection-pin-adapted one end of the first part with a contact element corresponding to the connection pin, and in the opposite, other end of the first part allow a conductor to pass through the hole into coaction with the contact element.

It will also be seen that a technical problem is one of realizing the significance of allowing said contact device to have a second part oriented in a longitudinal extension relative to said first part, located adjacent said second part, wherein the second part shall have the form of a plate whose opposite surfaces are intended to form gripping surfaces for inserting or withdrawing the contact device relative to the selected connection pin.

It will also be seen that a technical problem resides in realizing the significance of allowing the second part to have essentially the same size as said first part but to be mach thinner than said first part.

It will also be seen that a technical problem is one of providing conditions which, in the case of densely packed cross-connection contact devices, enable a plate belonging to a selected contact device to be gripped even when the plates of adjacent contact devices make exposure and accessibility of the gripping surfaces of said selected contact device difficult, and therewith realize the necessity of providing a bending zone, such as a weakening, on or adjacent the second part and located close to said first part, so as to enable one or more adjacent contact-device plates to be easily bent away from the plate belonging to the selected contact device that shall be inserted or withdrawn.

It will also be seen that a technical problem is one of realizing the significance of constructing a contact device such that said second part will include two parallel legs adapted for coaction with opposing surface parts of said first part.

Another technical problem is one of realizing the significance of providing said second part with a third leg which is positioned adjacent one of said parallel legs and provided with hook means intended for firm but readily releasable coaction with a recess in the base or base unit of the terminal unit.

It will also be seen that a technical problem is one of realizing the significance of and the advantages that are afforded by allowing the two legs of the contact device to be pivotal and elastically attached to said third leg.

In the case of a contact device of the aforedescribed kind, a technical problem resides in realizing the significance of allowing solely the third leg to form a connection with said plate.

It will also be seen that a technical problem is one of realizing the significance of providing one of the legs with a conductor-adapted recess.

It will also be seen that a technical problem is one of realizing the significance of giving the outer part of the third leg the form of a holder for two conductors.

It will also be seen that a technical problem is one of realizing the significance of and the advantages afforded by allowing a terminal unit or base unit for both subscriber-related connection pins and exchange-related connection pins to be loose in relation to said bar, which is fixed to the frame in other respects, and to allow said terminal unit or base unit to coact with corresponding contacts on a circuit board assembly through the medium of a contact device.

SOLUTION

With a starting point from a known cross-connection arrangement of the kind defined in the introduction, it is proposed in accordance with the invention to solve one or more of the aforesaid technical problems with the aid of "jumpers" with each conductor-end coacting with a specific contact device, while running respective jumper-associated conductor sections in a particular manner.

In this regard, it is proposed in accordance with the invention that the contact device has a first elongated part that includes a number (two) of through-penetrating longitudinally positioned holes, wherein each hole is adapted for coaction at one connection-pin-adapted end of the first part with a contact element corresponding to a connection pin, and in the other opposing end of said first part to pass a conductor through said hole into internal coaction with the contact element, and a second part which is orientated longitudinally in relation to said first part adjacent said second end, wherein said second part has the form of a plate whose opposite surfaces are intended to form gripping surfaces that enable the contact device to be inserted or withdrawn in relation to a selected connection pin.

The conductor will preferably extend from said second end and along the first part and into an open space defined by a bar to which said subscriber-associated terminal units are related, among other things.

According to proposed embodiments that lie within the scope of the inventive concept, the aforesaid second part is thinner than said first part, and a bending zone, such as a weakening, is provided on the second part closely adjacent said first part.

According to one preferred embodiment, the aforesaid second part has two mutually-parallel legs adapted for coaction with said first part.

It is particularly proposed that the aforesaid second part shall include a third leg adjacent one of said parallel legs, and that said third leg will include a hook means for coaction with a recess or aperture in the terminal unit or base unit.

The contact devices used will preferably be configured to enable two legs to be pivotally and resiliently attached to said third leg, said third leg forming a connection with said plate.

It is also proposed that one of the legs is provided with a conductor-adapted recess, and that the outer part of the third leg is formed as a holder for two conductors.

According to one embodiment of the invention that lies within the inventive concept, an elongated base unit that carries subscriber-related connection pins and telephone-exchange-related line-circuit-associated connection pins is caused to coact with contact devices belonging to a circuit board assembly, wherewith the base unit and applied jumpers can be readily separated from the contact devices of the circuit board assembly or readily connected thereto.

ADVANTAGES

Those advantages primarily afforded by an inventive cross-connection arrangement reside in the provision of conditions for simple insertion and withdrawal and exchange of utilized jumpers, where each such jumper is comprised of a conductor section and contact devices connected to opposing conductor ends, said contact devices having a form that will enable them to be densely packed, and wherein said conductors can be caused to extend in pairs in an open internal space defined by a bar and located above connection-pin arrangements and then, when required, completely side-related utilized subscriber-associated terminal units or base units.

Furthermore, the second part of the contact device has the form of a plate that includes a bending zone, such as a weakening, provided on the second part and located closely adjacent a first part, wherein opposing gripping surfaces of a selected contact device can be readily made accessible by bending aside a respective second part of one or more adjacent contact devices, so as to enable the gripping surfaces to be gripped comfortably.

The jumpers may be caused to coact with a base unit that has the form of a single row of terminal units, so as to enable said unit, with applied jumpers, to be disconnected or connected to a circuit board assembly or to a circuit board provided with contact devices.

The primary characteristic features of an inventive cross-connection arrangement are set forth in the characterizing clause of the following claim 1.

BRIEF DESCRIPTION OF THE DRAWINGS

The present invention will now be described in more detail with reference to an exemplifying embodiment at present preferred and also with reference to the accompanying drawings, in which FIG. 1 is a perspective view of a cabinet that accommodates a plurality of line interface boards, and shows a central column of telephone-exchange-related terminal units and subscriber-related terminal units belonging to the line interface circuits;

FIG. 2 illustrates in perspective a base unit comprised of an array of terminal units, and also shows utilized subscriber-associated terminal units in larger scale;

FIG. 3 is a perspective view of one of a plurality of jumpers utilizing a conductor section that includes two conductors and two end-connected connection devices;

FIG. 4 is a first perspective view of a slightly enlarged connection device;

FIG. 5 illustrates the connection device of FIG. 4 in a different perspective;

FIG. 6 is an exploded view of the connection device, without conductor sections;

FIG. 7 illustrates an arrangement comprising a plurality of juxtaposed connection devices wherein plates of respective connection devices can be bent to one side so as to enable a selected connection device to be gripped with the fingers of one hand; and FIG. 8 is an exploded sectional view of a base unit that includes contact devices and a printed circuit assembly.

DETAILED DESCRIPTION OF THE INVENTION

FIG. 1 is a perspective view of a cabinet that includes, inter alia, a telephone-exchange-related cross-connection arrangement.

The cabinet is referenced 1 and includes a frame having two mutually parallel opposing sides 1a, 1b and a cross-connection-associated side 1c.

The frame also includes a side 1d from which a number of blocks, such as block 10, can be inserted and withdrawn in a manner described in more detail hereinafter.

Each such block 10 may enclose a circuit board 10', which may include a plurality, such as thirty, line interface switches adapted for a telephone exchange.

Also shown in FIG. 1 are a plurality of subscriber-associated connection pins which are fixedly mounted on the frame and coordinated for coaction with one or more terminal units, of which the uppermost block is referenced 2a, and structured in superimposed rows to form a column 2. A number of frame-mounted telephone-exchange-related line-circuit-associated connection pins are coordinated on one or more terminal units, of which the uppermost block is referenced 3a, and structured in superimposed rows to form a column 3.

FIG. 1 shows that each subscriber-associated terminal unit 2a may be located in a column 2 situated outside the column 3 of terminal units 3a that are associated with said line circuits.

In the illustrated embodiment, however, one or more conductors belonging to the line-circuit associated terminal unite 3a is/are connected to the terminal units 3a' via a conductor run or via a circuit board.

In this way, both subscriber-related connection pins and exchange-related connection pins are coordinated in an elongated base unit 29.

In this embodiment, a circuit board or the like has an edge-related contact device into and from which said base unit 29 can be inserted and withdrawn via corresponding contact devices.

The base unit 29 can thus be inserted and withdrawn without needing to influence applied jumpers and their respective contact devices.

The terminal units 2a, 3a' positioned in a row in the base unit 29 may conveniently be comprised of standard and/or known terminal units, wherein each block or part thereof includes a predetermined number of connection pins.

The terminal units 2a, 3a' and columns 2, 3' are arranged close together with requisite jumpers arranged to connect electrically selected pairs of subscriber-associated connection pins with pairs of selected line-circuit-associated connection pins in the same base unit or in different base units.

A relatively large number of jumpers will be used, since each connected subscriber must have two physical conductors in an electric connection with an own line circuit.

For the sake of simplicity, only one jumper 23 is shown in FIG. 1, said jumper being connected to its respective pins in a manner described in more detail hereinafter.

A predetermined number of exchange-related known line circuits, in the illustrated case thirty circuits, are coordinated in a block 10 that carries a printed circuit board assembly 10'.

In respect of its application in a telephone exchange, the inventive arrangement requires access to a large number of subscriber-associated conductors available for connection to a subscriber-allocated line circuit via a cross-connection arrangement 23.

The cross-connection arrangement will require a plurality of such blocks in practice. However, since remaining blocks are identical with the block 10, only the block 10 will be described in the following description.

Each block 10 has an outer two-part casing 10c that is made of metal, for instance aluminium, and encloses a printed circuit board 10' whose electrical coaction with the surroundings, connection pins and terminal units belonging to line; circuits, is effected through the medium of block-carried connection pins 10d.

Although the circuit board assembly may have various functions, the following description is concentrated solely on circuit boards that include line circuits.

The arrangement includes mutually parallel U-bars 11, 12 along which respective blocks 10 can be inserted and withdrawn, said U-bars being attached to the frame in a known manner and then particularly to the frame sides 1a, and 1b, formed by cooling flanges 13, 14.

The leading part of the block 10, as seen in its insertion direction, includes line-circuit allocated and block-associated connection pins 10d coordinated in a terminal unit 10e, wherein said pins are in electrical coaction with exchange-related connection pins coordinated in a terminal unit, such as the blocks 3a or 3a', when the block 10 is in a fully inserted position.

It is important that block-associated connection pins 10e can be caused to coact electrically with the connection pins on the terminal units 3a or 3a' either directly or indirectly, and therewith be externally available for connection to subscribers via the jumpers 23.

The block 10 and the U-bars 11, 12 coact mechanically such that heat generated in the block by the components thereof will be conducted to the frame sides 1a, 1b and from there to the cooling flanges 13, 14 on said sides.

Heat-generating discrete components 10a, 10b, such as transformers, diodes, transistors, will preferably be positioned on the circuit board 10' close to areas that lie proximal to the U-bars 11, 12, depending on increasing power development.

The thickness of the metal casing or block and the distribution of said thickness are adapted to achieve satisfactory heat transfer via the U-bars 11 and 12.

The casing 10c may be given different thicknesses, while the U-bars 11, 12 may be given different lengths and widths;.

The casing may be given a thickness such that an increase in temperature will lie within given limit values even under high loads of short duration, e.g. durations shorter than 30 min.

The casing 10c may also be completely sealed, to afford effective EMC protection.

The block may also be provided with one or more surface enlargements.

Such an enlargement may be achieved with cooling flanges 10g' provided on that edge 10g of the block 10 that lies distal from the terminal unit 10d.

It will be evident that the line circuit-related terminal unit 10e of the block 10 shall be capable of coacting with a corresponding terminal unit 10h in a further block 15, which in turn has a terminal unit 15a capable of being in electrical coaction with the line-circuit-associated terminal units 3a or 3a'.

The further block 15 may comprise a simple connection between the connection pins in the terminal units 10e and 15a, or may contain circuit connections and/or circuit arrangements as an overvoltage protection.

Mutually opposing U-bars 11, 12 are fastened directly to adjacent cooling flanges in a known manner, and the legs 11a, 11b of said U-bars have a length and a width that will provide desired heat transmission.

The distance between said legs shall only slightly exceed the thickness of the block 10.

FIG. 1 is intended to illustrated that subscriber-associated cables shall be disposed in a space and that existing conductors shall be attached to the rear side of the terminal unit 2a through the medium of a connection device, so as to leave the front sides 3 for requisite jumpers.

In practice, mutually adjacent blocks will be closer to one another than the illustrated blocks.

By way of an alternative, the circuit board 10' (referenced 10" in FIG. 8) may have a contact device (not shown) on its inner edge, this contact device being intended for coaction with a corresponding contact device (hidden in FIG. 2) in the terminal unit or base 29.

FIG. 2 is a perspective view of a base unit 29 which includes therealong a first terminal unit 2a and a second terminal unit 3a'. The base unit, or mounting base, 29 is placed between the legs 20a and 20b of a U-bar 20 to which the terminal unit 3a is also attached.

The U-bar 20 is fixed in relation to the frame 1 in a known manner, and firmly holds the base unit 29 through the medium of known fasteners.

Selected connection pins on the terminal unit 3a' may be connected to the line circuits by illustrated conductors 21', 22', and selected connection pins 24, 24' in the terminal unit 2a may be connected to subscriber conductors.

For the sake of simplifying the illustration, FIG. 2 shows that the two conductors 21', 22' are connected to two connection pins in the terminal unit 3a' and make accessible a line circuit on the printed circuit board 10' (or a printed circuit board 10" having edge-related connection devices 80) and can be connected to two subscriber-line associated conductors 21, 22 via a jumper (23), said conductors 21, 22 being made accessible through the medium of two connection pins in the terminal unit 2a.

FIG. 1 illustrates another conceivable cross-connection arrangement in which the conductor section 23 extends from a contact device into a free space, bends to the left against the left-hand edge, bends downwards and beyond a number of base units, bends to the right through a further free space, and then bends outwards into contact with the contact device.

The terminal units 2a and 3a' are coordinated in a base unit or mounting base 29 and are comprised of an upper insulated U-bar 23a and a lower insulated U-bar 23b, wherein connection pins 24, 24' are positioned in two rows in close proximity with one another.

The U-bar 23a includes apertures 25 for coaction with and for securing a respective contact device 33 in a fully inserted position of said contact device.

FIG. 3 illustrates a jumper that is particularly adapted for the invention and that includes a pair of conductors 31 and 32 connected to a first contact device 33 and to a second contact device 34. Since the contact devices are identical, only the contact device 33 will be described hereinafter, with reference to FIGS. 4, 5 and 6.

The contact device 33 has an elongated part 41 that includes a number (2) of through-penetrating, longitudinally extending holes 41a, 41a'. Each hole is adapted to coact in the connection-pin adapted one end 41b of the first part with contact elements 41c, 41c' corresponding to said connection pin, and in the opposite end 41d of said first part to enable the conductors 31, 32 to run through respective holes 41a, 41a' for internal coaction with the contact element 41c, 41c'.

The contact device also includes a second part 42 that extends longitudinally in relation to said first part 41 and located adjacent said second end 41d.

The second part 42 has the form of a plate 42a whose opposing gripping surfaces 42a', 42a" are adapted to enable the contact device 33 to be inserted and withdrawn relative to selected connection pins.

The conductors 31, 32 can be angled from the holes 41a, 41a' through an angle of 180° and run from said second end 41d along and over the first part 41 and into an open space 26 formed within the bar 20 to which said subscriber-related connection pins in the terminal unit 2a are related.

The second part 42 of the contact device is thinner than the first part 41.

A bending zone in the form of a thinning or weakening 42b, 42b' is provided adjacent the second part 42 and located close to said first part 41, thereby enabling the plate 42a to be readily angled and turned about a turning axis "A".

The second part 42 of the contact device has two parallel legs 42d and 42e which are intended for direct coaction with the upper and lower mutually opposing, parallel delimiting surfaces of the first part 41.

The second part 42 also includes a third leg 42f which is positioned adjacent one of the parallel legs, in this case the leg 42d, and includes a hook means 42g intended for snap-connection with an aperture 25 provided in the front edge of a terminal unit 29.

The two legs 42d, 42e are mutually joined by a cross-leg 42h and are pivotally and resiliently attached to the third leg 42f.

The third leg 42f forms the sole connection with the plate 42a, and one of the legs, the leg 42d in the illustrated case, is provided with a conductor-adapted aperture 42i.

The outer part 42f' of the third leg 42f is configured as a holder 42k for two conductors.

As illustrated in FIG. 7, the second part 42 of a chosen connection device 33 of the kind illustrated in FIGS. 4, 5 and 6 is readily accessible, by virtue of the fact that the gripping surfaces 42a' and 42a" can be exposed by pressing the second parts 742, 742' (742") of one or more adjacent contact devices 733, 733' to one side with the tips of the fingers.

FIG. 8 is an exploded sectional view illustrating an alternative embodiment of a base unit 29 that includes internal contact pins 124, 124' which are positioned for coaction with contact sleeves 81, 82 in an elongated connection device 80 arranged relative to one edge of a circuit board, said contact device 80 coacting with the circuit board 10" in a known manner.

The extension of the connection device 80 may correspond to the extension of the terminal unit 3a', and a similar connection device 80' may have a longitudinal extension corresponding to the longitudinal extension of the terminal unit 2a.

It will be understood that the invention is not restricted to the aforedescribed and illustrated exemplifying embodiments thereof and that modifications can be made within the scope of the inventive concept as defined in the following Claims.

We claim:

1. A cross-connection arrangement adapted for a telephone exchange comprising a frame, a number of frame-mounted subscriber-related connection pins in one or more terminal units, a number of frame-mounted telephone exchange-related line-circuit-associated connection pins in one or more terminal units, wherein said terminal units are arranged close together and include necessary jumpers for connecting selected subscriber-related connection pins with selected telephone-exchange-related connection pins via contact devices connected to ends of conductors nd laving contact elements and end gripping surfaces in an elongated body part, said contact devices includes a first elongated part including a number of longitudinally extending and through-penetrating holes, wherein each respective hole has a contact element at a first end, and at an opposite end said conductor to ran through the hole and into coaction with said contact element, wherein a second part extends longitudinally in relation to said first part and is located adjacent said opposite end; in that said second part having the form of a plate whose mutually opposite surfaces form gripping surfaces for inserting or withdrawing the contact device in relation to selected connection pins; and in that said conductors are arranged to run from said second end along the first part and into an open space defined by a U-bar to which said subscriber-associated terminal units are related.

2. An arrangement according to claim 1, wherein said second part is dimensioned to be thinner than said first part.

3. An arrangement according to claim 1, wherein a bending zone, such as a weakening, is provided on, or adjacent, the second part and located adjacent said first part.

4. An arrangement according to claim 1, wherein said second part includes two legs for coaction with said first part.

5. An arrangement according to claim 4, wherein said second part includes a third leg which is located adjacent one of the aforesaid two legs and includes a hook means for coaction with an aperture provided in the terminal unit.

6. An arrangement according to claim 5, wherein said two legs are pivotally and resiliently attached to said third leg.

7. An arrangement according to claim 5, wherein said third leg forms a connection with said plate.

8. An arrangement according to claim 4, wherein one of the legs is provided with a conductor-adapted aperture.

9. An arrangement according to claim 1, wherein an outer part of a third leg is configured to form a holder for a number of conductors.

10. An arrangement according to claim 1, wherein a terminal unit or a number of terminal units is/are removably attached to a contact U-bar mounted on a printed circuit board or circuit board assembly and functioning as an electrical contact means.

11. An arrangement according to claim 1, wherein the circuit board or circuit board assembly includes arm elongated contact device for coaction with the contact U-bar.

12. An arrangement according to claim 2, wherein a bending zone, such as a weakening, is provided on, or adjacent, the second part and located adjacent said first part.

13. An arrangement according to claim 2, wherein said second part includes two legs for coaction with said first part.

14. An arrangement according to claim 3, wherein said second part includes two legs for coaction with said first part.

15. An arrangement according to claim 12, wherein said second part includes two legs for coaction with said first part.

16. An arrangement according to claim 5, wherein an outer part of said third leg is configured to form a holder for a number of conductors.

17. An arrangement according to claim 10, wherein the circuit board or circuit board assembly includes an elongated contact device for coaction with the contact U-bar.

* * * * *